United States Patent
Buelow, II et al.

(10) Patent No.: US 7,220,035 B2
(45) Date of Patent: May 22, 2007

(54) COMPACT, HIGH-EFFICIENCY ILLUMINATION SYSTEM FOR VIDEO-IMAGING DEVICES

(75) Inventors: Roger F. Buelow, II, Gates Mills, OH (US); Wayne R. Hellman, Aurora, OH (US); Juris Sulcs, Chagrin Falls, OH (US); John M. Davenport, Middleburg Heights, OH (US); Raymond A. Buchina, Mentor, OH (US); Gregory P. Frankiewicz, Mayfield Heights, OH (US)

(73) Assignee: Fiberstars, Inc., Solon, OH (US)

( * ) Notice: Subject to any disclaimer, the term of this patent is extended or adjusted under 35 U.S.C. 154(b) by 287 days.

(21) Appl. No.: 10/794,623

(22) Filed: Mar. 5, 2004

(65) Prior Publication Data

US 2004/0174709 A1    Sep. 9, 2004

Related U.S. Application Data

(60) Provisional application No. 60/452,821, filed on Mar. 7, 2003.

(51) Int. Cl.
 *F21V 7/04* (2006.01)
(52) U.S. Cl. .................... 362/560; 362/310; 349/62; 359/853; 385/43

(58) Field of Classification Search ................ 362/558, 362/560, 310, 296; 385/43; 359/853; 349/62
See application file for complete search history.

(56) References Cited

U.S. PATENT DOCUMENTS

| | | | | |
|---|---|---|---|---|
| 3,676,667 | A | * | 7/1972 | Malifaud ..................... 362/301 |
| 4,003,638 | A | * | 1/1977 | Winston ..................... 359/852 |
| 4,765,718 | A | * | 8/1988 | Henkes ........................ 349/62 |
| 4,915,479 | A | * | 4/1990 | Clarke ........................ 349/62 |
| 5,146,248 | A | * | 9/1992 | Duwaer et al. ............. 362/310 |
| 5,675,677 | A | * | 10/1997 | Davenport et al. ........... 385/31 |
| 6,304,693 | B1 | | 10/2001 | Buelow, II et al. |
| 6,554,456 | B1 | * | 4/2003 | Buelow et al. ............. 362/347 |

\* cited by examiner

*Primary Examiner*—Sandra O'Shea
*Assistant Examiner*—Ismael Negron
(74) *Attorney, Agent, or Firm*—Charles E. Bruzga; Bruzga & Associates

(57) ABSTRACT

An illumination system for a video-imaging device has a light source and a collector of light from the light source. The collector is formed according to the principles of non-imaging optics and receives a portion of the light from the light source. The collector is configured to reduce the angular distribution of the collected light from the light source to match the requirements of a digital pixelation device.

37 Claims, 6 Drawing Sheets

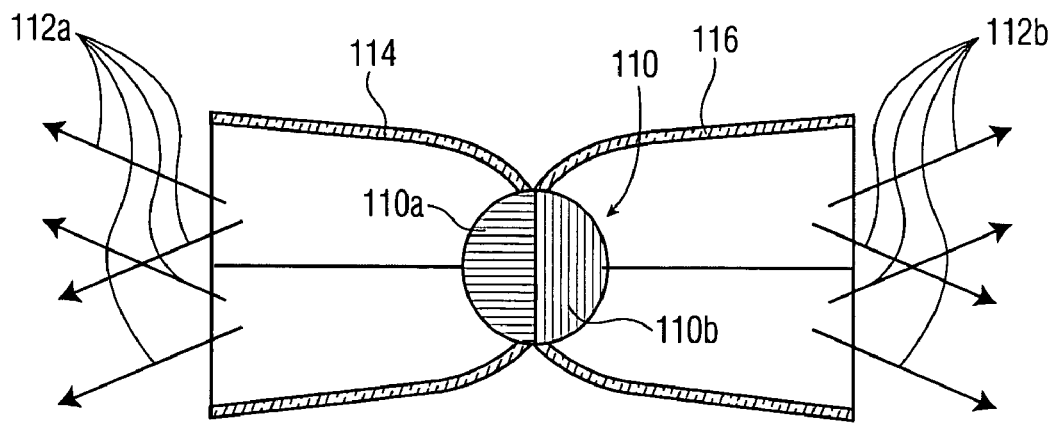
FIG. 5
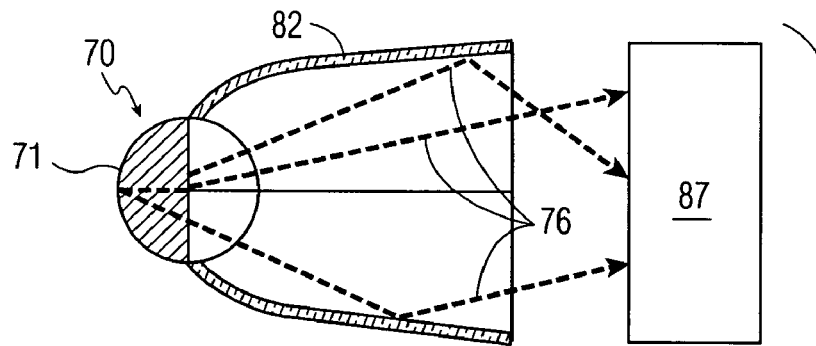
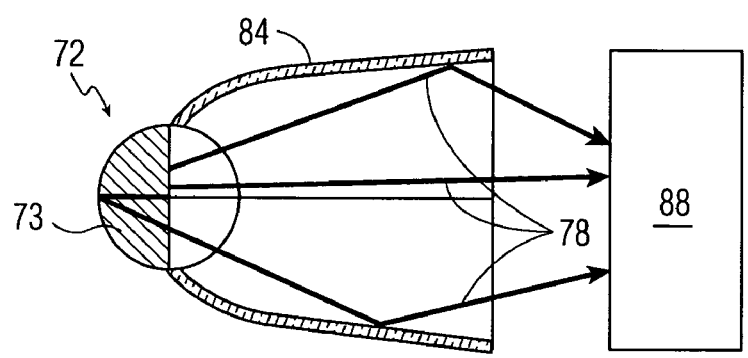
FIG. 6
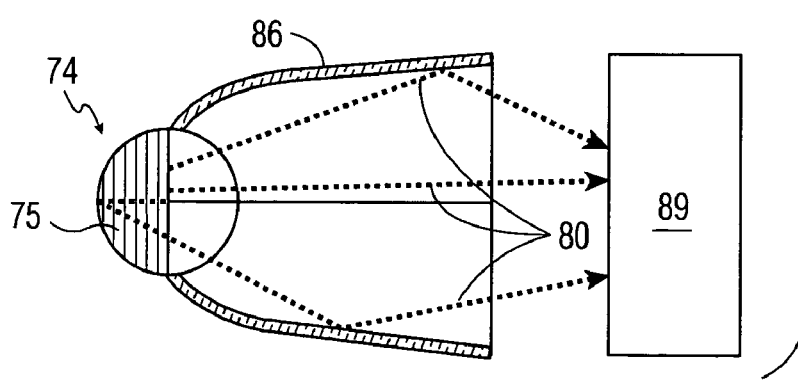

COMPACT, HIGH-EFFICIENCY ILLUMINATION SYSTEM FOR VIDEO-IMAGING DEVICES

This application claims priority from U.S. Provisional Patent Application No. 60/452,821 filed Mar. 17, 2003.

FIELD OF THE INVENTION

The present invention relates to a compact and more efficient illumination system for video imaging devices. More particularly, the invention relates to the use of non-imaging optics and a high intensity light source to provide enough light at the proper angular distribution for video imaging devices to more fully take advantage of the efficiencies inherent in high intensity discharge devices.

BACKGROUND OF THE INVENTION

Modern video-imaging systems use high brightness lamps to transmit an image either through, or reflected from, a small digital pixelation device. As used herein, a "digital pixelation device" ("DPD") can comprise many small mirrors, a liquid crystal display (LCD), or one of many other concepts being developed for video-imaging devices. For instance, Texas Instruments, of Dallas, Tex., has developed digital light processing (DLP), which is an example of a DPD. The lamps used to drive a DPD are often ultra-high pressure (UHP) mercury lamps, chosen for their white color spectrum and high brightness. The optics used to collect the light consist exclusively of imaging optics, that is, of reflectors made of one, or several, elliptical or parabolic reflectors.

Imaging optics have disadvantages in that (1) they are inherently inefficient, (2) they preserve artifacts of the light source (such as very bright or very dim regions), and (3) they are large and often need a long air gap between the light source and the digital pixelation device.

Further, the angular distribution of light in the foregoing video projection systems is very important. Too broad a spread will result in light "bleeding" through from pixel to pixel, which affects the overall quality of the picture—especially in dark sections. Too narrow a distribution can be a problem when it is desired to make the image viewable at wide angles to the screen. Systems using non-imaging optics can be designed to substantially match the angular distribution of light needed. For instance, to supply light below 15 degrees to a HDTV DLP, 1.5" diagonally and 16:9 aspect ratio, the lamp diameter would be 7.3 mm. Metal Halide lamps of this size, which are capable of operation in the presence of oxygen, are currently available.

It would be desirable to provide an illumination system for video-imaging devices based on non-imaging optics, which is highly efficient and very compact compared to systems based on imaging optics, without sacrificing, or even improving, quality.

It would also be desirable to provide an illumination system for video-imaging devices based on non-imaging optics, which can eliminate some of the components required for illumination systems based on imaging optics.

SUMMARY OF THE INVENTION

By employing non-imaging optics, the illumination systems for video-imaging devices described herein overcome many problems of the prior art systems based on imaging optics. Fiberstars Inc., of Solon, Ohio, the present assignee, has successfully used non-imaging optics as a basis for large increases in illumination system efficiency, such as with its Product No. EFO-4+4-NC-120. Fiberstars Inc. has increased light coupling efficiency by 30% for fixtures using non-imaging optics compared to those that use imaging optics. Fiberstars Inc. has also made fiber optics systems that are 200-400% more efficient than the imaging optics-based fiber optics systems produced up through about the year 2000.

Because systems using non-imaging optics control essentially all of the light from a source, very high efficiencies are realized in the coupling of light from light source to the collector. The light is transformed to the appropriate angle and spatial distribution using collectors, preferably comprising hollow angle-to-area converters. The shape of the output spatial distribution can be made to match the shape of the digital pixelation device, which is usually rectangular.

As determined by the present inventors, because non-imaging systems map, or transform, light from angular space to an area, artifacts of high and low brightness that naturally exist in all arc sources are not preserved, or brought forward, in the spatial output of the system. This results in a substantially even distribution of light for every pixel with improved pixel-to-pixel uniformity when compared to imaging optics systems.

Additionally, higher brightness can be realized by using thin film coatings on a light source used in the inventive systems. A mirror can be applied to the light source which reflects a substantial portion of the light that would leave the "back" hemisphere so that it exits the light source through the "front" hemisphere which is protruding into a non-imaging collector. This reflector can also be made to pass unwanted ultraviolet (UV) and infrared (IR) radiation and to reflect only light.

Other advantages of the invention will become apparent from the following description.

One embodiment of the invention provides an illumination system for a video-imaging device having a light source and a collector of light from the light source. The collector is formed according to the principles of non-imaging optics and receives a portion of the light from the light source. The collector is configured to reduce the angular distribution of the collected light from the light source to match the requirements of a digital pixelation device. This system is highly efficient and compact compared to systems based on imaging optics, and can eliminate some of the components required for systems based on imaging optics.

More extensive illumination systems are also described herein.

BRIEF DESCRIPTION OF THE DRAWINGS

In the drawings, like reference numerals refer to like parts, whose written description may thus be mentioned only for a single figure.

FIG. 5 is similar to FIG. 4a, but shows a two-collector system rather than a three-collector system as in FIG. 4a.

FIGS. 6 is a side view, partially in cross section, of a three-light source system in accordance with the invention, with a portion of the arctube for each light source shown with a cross-hatch pattern, for convenience, to indicate respective coatings.

DETAILED DESCRIPTION OF THE INVENTION

Figure 1A:
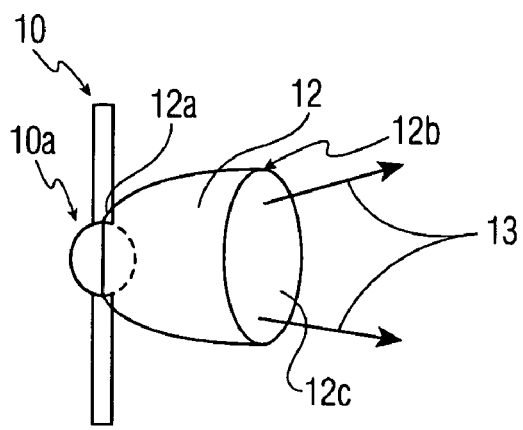
FIG. 1a is side perspective view of a prior art non-imaging light-collector used with a metal halide lamp, but not used for illuminating video-imaging devices.
Figure 1B:
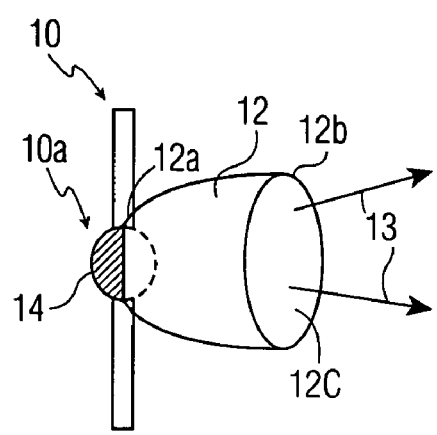
FIG. 1b is similar to FIG. 1a, but shows in a prior art manner a mirror coating on about one hemisphere of an arctube of the lamp for reflecting light through the other hemisphere and into a collector, but not used for illuminating video-imaging devices.

To put the present illumination system for video-imaging devices in perspective, the prior art lighting devices of FIGS. 1a and 1b, not used for illuminating video-imaging devices, are first considered. FIG. 1a shows a light source 10, such as a metal halide discharge lamp. A bulbous section, or arctube, 10a of the lamp extends into an inlet 12a of a non-imaging light-collector 12. Collector 12 performs an angle-to-area conversion on light from source 10, reducing the angle of light 13 to a lower half angle, such as 38 degrees, for reception by a light pipe (not shown), for instance. Inlet 12a of the collector, and outlet 12b of the collector, are both round or oval. The collector shown is hollow, and has an interior reflective coating 12c. Prior art FIG. 1b is similar to FIG. 1a but shows a mirror coating 14 on about one hemisphere of arctube 10a of the lamp, for reflecting visible light through the other hemisphere and into collector 12. U.S. Pat. No. 6,304,693 for Efficient Arrangement for Coupling Light from a Light Source to a Light Guide by Roger F. Buelow II et al., assigned to the present assignee, discloses further details of the prior art devices of FIGS. 1a and 1b.

The following description refers to the three topics of (1) illumination systems for a single DPD, (2) illumination systems for multiple DPD's and (3) compactness of the inventive illumination systems.

1. Illumination Systems for a Single DPD

Figure 2A:
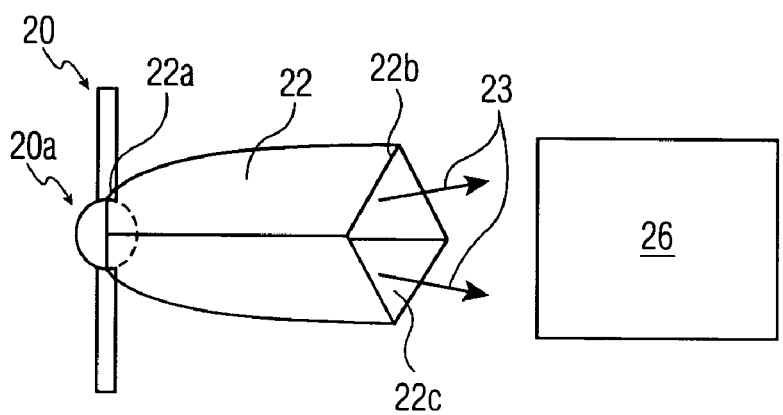
FIGS. 2a and 2b are side views in perspective, partially in block form, of a video-imaging illuminating system in accordance with the present invention.
Figure 2B:
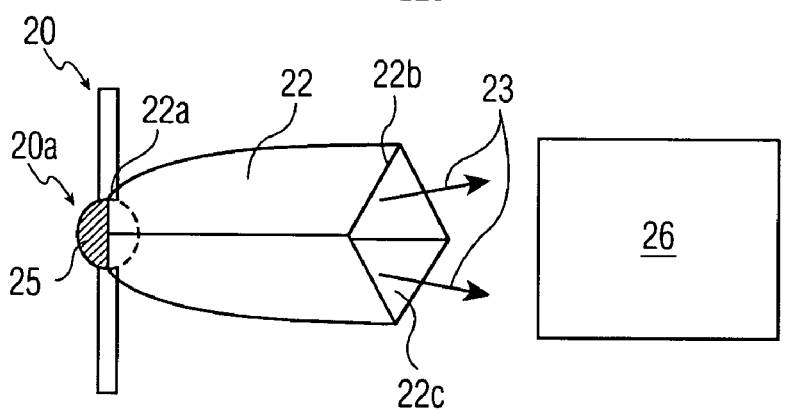

FIGS. 2a and 2b show single white-light source illumination systems for a digital pixelation device ("OPO"), in accordance with the present invention. FIG. 2a shows a light source or lamp 20, such as a metal halide lamp, a high pressure mercury lamp, a Xenon lamp, or a Xenon-mercury lamp. FIG. 2a further shows a non-imaging light collector 22, in accordance with a preferred embodiment of the invention, in which the collector preferably changes shape from a round inlet or input 22a, which matches bulbous section, or arctube, 20a, to a rectangular (e.g., square) outlet 22b, to match the shape of the intended target DPD 26. However, collectors with other outlet shapes, such as round or oblong could be used. Light enters the collector from lamp 20 at near a half angle of 90 degrees. The collector is sufficiently long and has the proper area to create an angular distribution of light 23 at a half angle of 10 degrees, for instance, to match the etendue requirements of the DPD. Collector 22 is preferably hollow, with an interior, reflective coating 22c.

FIG. 2b is similar to FIG. 2a, but shows a mirrored coating 25 on one hemisphere (approx.) of bulbous section, or arctube, 20a of the light source to reflect light it receives back towards input 22a of the collector via the non-coated, other hemisphere (approx.) of the arctube.

Figure 2C:
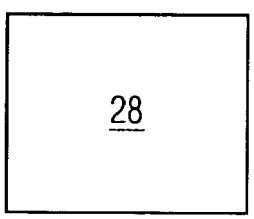
FIG. 2c is a block diagram form of an alternative light source for use in the systems of FIGS. 2a and 2b.

Light source 20 of FIGS. 2a and 2b could also comprise a light-emitting diode such as shown at 28 in FIG. 2c, in addition to other types of lamps.

Figure 3A:
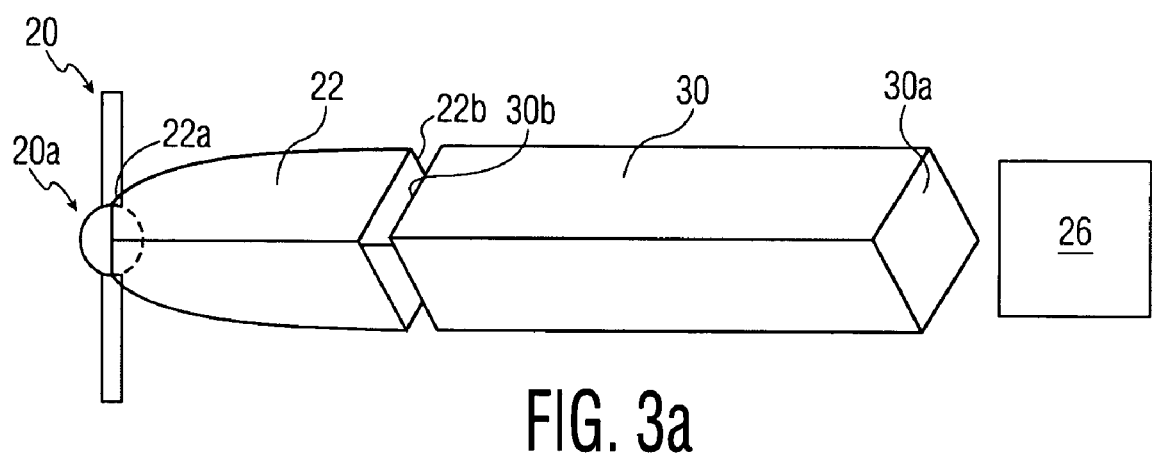
FIG. 3a is similar to FIG. 2a, but also shows a solid averaging rod receiving light from a light-collector.

FIG. 3a is similar to FIG. 2a, but also shows an averaging rod 30, of glass or quartz, for instance, receiving light from light-collector 22. Averaging rod 30 provides light at its outlet 30a representing an average of light received at its inlet 30b. In this way, averaging rod 30 improves the spatial uniformity of the light delivered to DPD 26. Thin film coatings (not shown) can be applied to rod 30 to control ultraviolet (UV) and infrared (IR) radiation. The coatings preferably include a antireflective (AR) element to improve efficiency. A thin film coating is also known as multi-layer optical interference coating, in which multiple layers of material collectively form a single coating. Alternatively, separate UV and/or IR filters (not shown) may be placed in line with the input or output of averaging rod 30 instead of using thin film coatings directly on the is rod face(s).

Figure 3B:
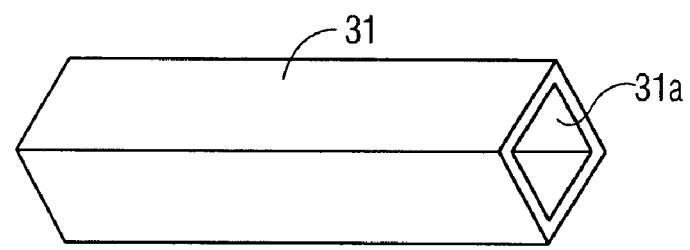
FIG. 3b shows a side view in perspective of a hollow averaging rod.

FIG. 3b shows an alternative averaging rod 31, of glass or quartz, for instance that may be used instead of rod 30 of FIG. 3a, which is solid. The interior of rod 31 may have a mirror coating 31a. In this case if UV and/or IR control is needed, then additional filters (not shown) can be placed in line with the input or output of hollow averaging rod 31.

Prior art illumination systems (not shown) for videoimaging devices using imaging optics often employ a secondary averaging device (not shown) to provide even illumination, but this adds expense while reducing efficiency and brightness. Secondary averaging devices, such as that labeled 30 in FIG. 3, can be used with non-imaging based systems to get essentially perfect averaging for the highestend (i.e., most costly) systems. However, the distribution of light as produced by a non-imaging coupler or light collector alone (e.g., 22, FIGS. 2a and 2b) is substantially more uniform than with imaging systems and is usually adequate.

2. Illumination Systems for Multiple DPD's

In the prior art, the most accurate and desirable videoimaging systems employ more than one digital pixelation device. These systems use three devices, one each to handle red, blue and green light. In order to use the three devices, the light from the source must be split into red, blue and green components. This is done using complicated beam splitters and prisms in the prior art imaging systems.

However, when using non-imaging systems in accordance with the invention, respective coatings can be placed on a bulbous section, or arctube, of a light source, so that particular colors of light exit only through particular regions of the source. Non-imaging couplers, according to the invention, can collect colored light from each of these regions, so that devices for color splitting as used in the prior art are not required. This results in a very efficient way of splitting the light, and is shown in FIG. 4.

Figure 4A:
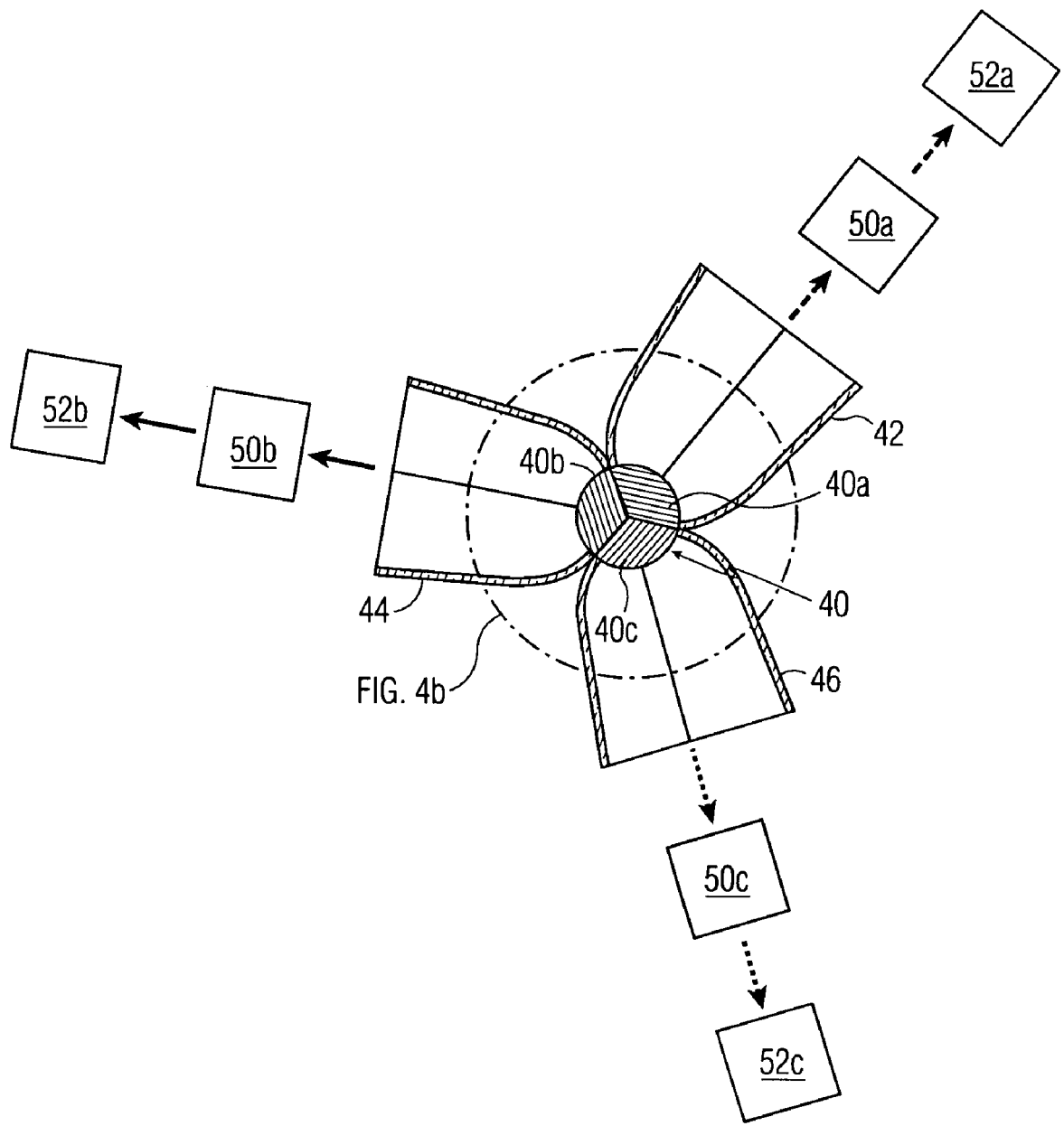
FIG. 4a is a top plan view, partly in cross section, of a light source associated with three non-imaging collectors, the light source shown simplified and the three different cross-hatching patterns shown on the light source representing three different coatings.

FIG. 4a shows a single-lamp illumination system that preferably extracts the three primary colors, red, blue and green, from a single lamp. FIG. 4 thus shows the bulbous section, or arctube, 40 of a lamp, which has three respective portions 40a, 40b, and 40c, received within respective inlets of non-imaging light-collectors 42, 44 and 46, which are generally similar to collector 22 of FIGS. 2a-2b and 3. However, each collector 42, 44 and 46 is preferably optimized to reflect only one of the three desired colors of light of, for instance, red, green and blue, respectively. Preferably, portions 40a-40c extend into the collectors, and preferably such portions constitute substantially a third of the arctube 40. The light output of collectors 42, 44 and 46 may pass through optional averaging rods 50a, 50b and 50c, respectively, before passing into respective DPD's 52a, 52b and 52c.

Figure 4B:
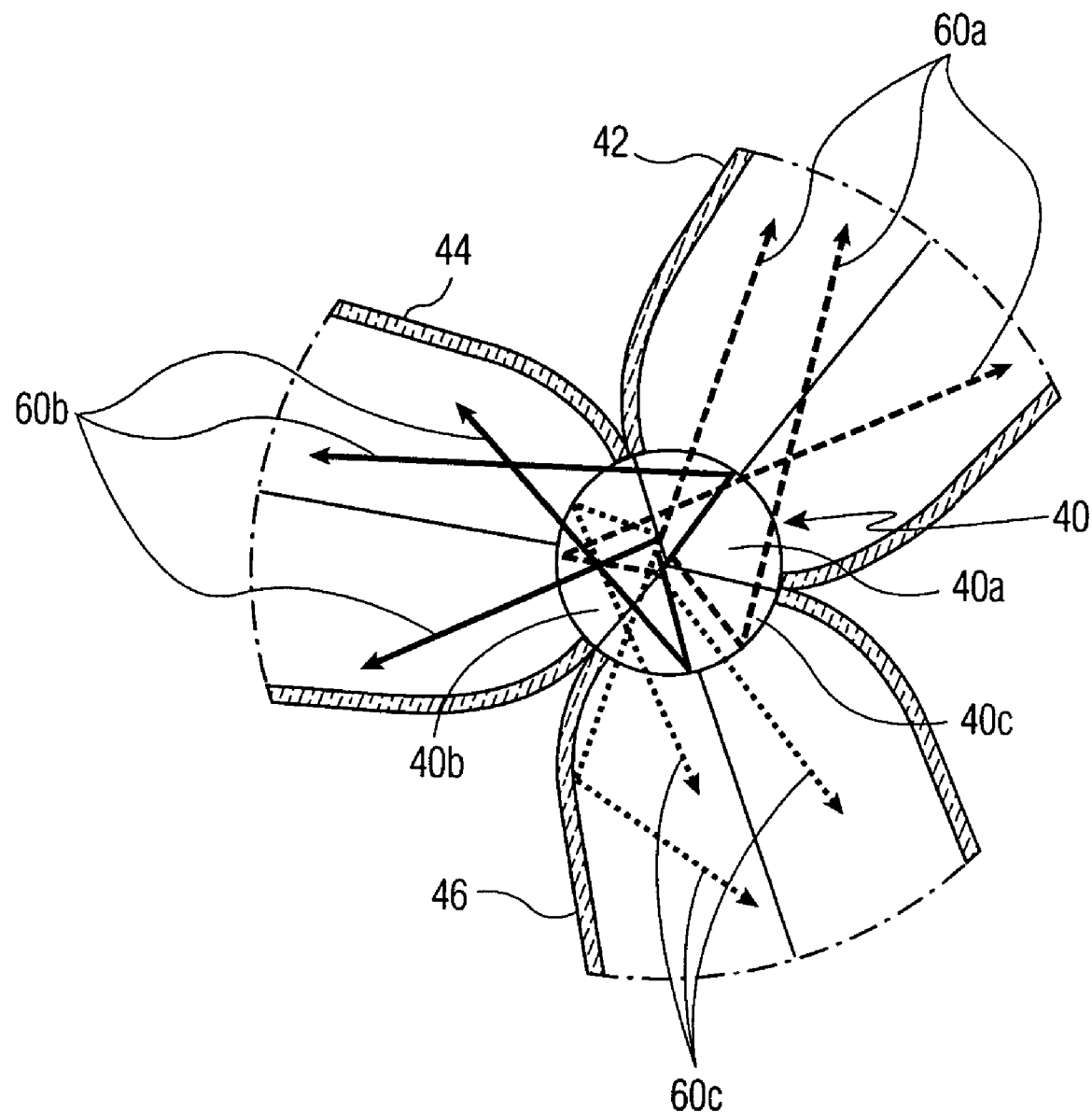
FIG. 4b is an enlargement of the circled portion of FIG. 4a labeled FIG. 4b, with cross-hatching patterns on an arctube removed.

In FIG. 4a, the three different cross-hatching patterns shown on bulbous section, or arctube, 40, at 40a, 40b and 40c represent three different coatings, each one preferably passing a respective desired color and reflecting all other light. For example, in a preferred construction, a coating on portion 40a maximally passes red light but reflects blue and green light; a coating on portion 40b maximally passes blue light and reflects green and red light; and a coating on portion 40c maximally passes the green light and passes red and blue light. In this connection, FIG. 4b shows how light rays of different wavelength, and hence color, preferentially enter the different collectors. Thus, rays 60a of wavelength producing red, directly or by reflection, enter collector 42; rays 60b of wavelength producing blue, directly or by reflection, enter collector 44; and rays 60c of wavelength producing green, directly or by reflection, enter collector 46.

FIG. 5 shows a variation upon the three-collector system of FIGS. 4a-4b, in which two collectors are used with a single light source, rather than three collectors. The optical principles described for FIGS. 4a and 4b are generally applicable to FIG. 5 (e.g., regarding optimization of collectors), but are modified as now mentioned.

In FIG. 5, the two different cross-hatching patterns 110a and 110b shown on bulbous section, or arctube, 110, represent two different coatings, each one preferably passing a respective desired color or colors (or other portion of the light spectrum) and reflecting all other light. For example, in a preferred construction, the coating represented by pattern 110a maximally passes blue light, shown as rays 112a that pass through a collector 114, but reflects red and green light; and the coating represented by Pattern 110b maximally passes red and green light, shown as rays 112b that pass through a collector 116, and reflects blue light. Then, the red and green light 112b can be further separated into red light and green light by an additional filter set (not shown).

Alternately, in FIG. 5, light source associated with bulbous section 110 can be designed for increased delivery of blue and green light when compared to a regular white light source containing a balance of blue, green and red light. In this embodiment, the coatings represented by patterns 110a and 110b would preferentially direct blue light as rays 112a and green light as rays 112b. Red light for a DPD may then be provided by a separate light source (not shown), such a light-emitting diode (LED) that emits light strongly in the proper red wavelength.

As an alternative to using a single lamp for producing different colors, as in FIGS. 4a-4b and FIG. 5, an illumination system using three separate light sources could be used. The light spectrum resulting from a single high pressure mercury lamp may not be capable of producing the required amounts of red, green, and/or blue light. However a metal halide lamp (not shown) can be designed to produce the required spectrum of any one of the individual colors alone. So, three metal halide lamps (not shown) can be used, or alternatively, lamps comprising light-emitting diodes could be used. One lamp, for instance produces green light, and preferably has about half a hemisphere of its bulbous section (not shown), or arctube, coated to reflect green light. Its associated collector preferably has an internal coating optimized for green light. By being optimized for a particular color, the use of the coating is more efficient than the use of a mirror. Similar subsystems are used for red and blue light. This results in an illumination system with three coated lamps and collectors, each of which is preferably optimized to produce one of the three required colors. Such a system is shown in FIG. 6.

FIG. 6 shows a preferred, three-light source system in accordance with the invention for producing high performance, high quality video systems. Bulbous sections 70, 72 and 74 of three different light sources may have respective coatings 71, 73 and 75 on about preferably a half hemisphere to allow maximum reflection of red, blue and green light, respectively, while passing other colors. The light sources are preferably metal halide lamps designed to produce maximum light in red, blue and green colors, for instance. The lowermost-shown light ray of rays 76, 78 and 80, associated with the three different light sources, each reflect from an associated coating so as to pass through an uncoated portion of the lamps and into associated non-imaging collectors, 82, 84 and 86, respectively. The coated portions of bulbous sections 70, 72 and 74, which do not protrude into their associated collectors, preferably represent about a half hemisphere. Light sources incorporating bulbous sections 70, 72, and 74 are preferably optimized to produce red, blue and green light, respectively, by way of example. As with the system of FIGS. 4a and 4b, the collectors 82, 84 and 86 are preferably respectively optimized to reflect red, blue and green light, for instance.

The illumination system of FIG. 6 comprises three separate subsystems, one to deliver red light, one to deliver green light and another to deliver blue light, for instance, with the proper angular distribution of light, towards individual DPD's 87, 88 and 89.

Figure 7:
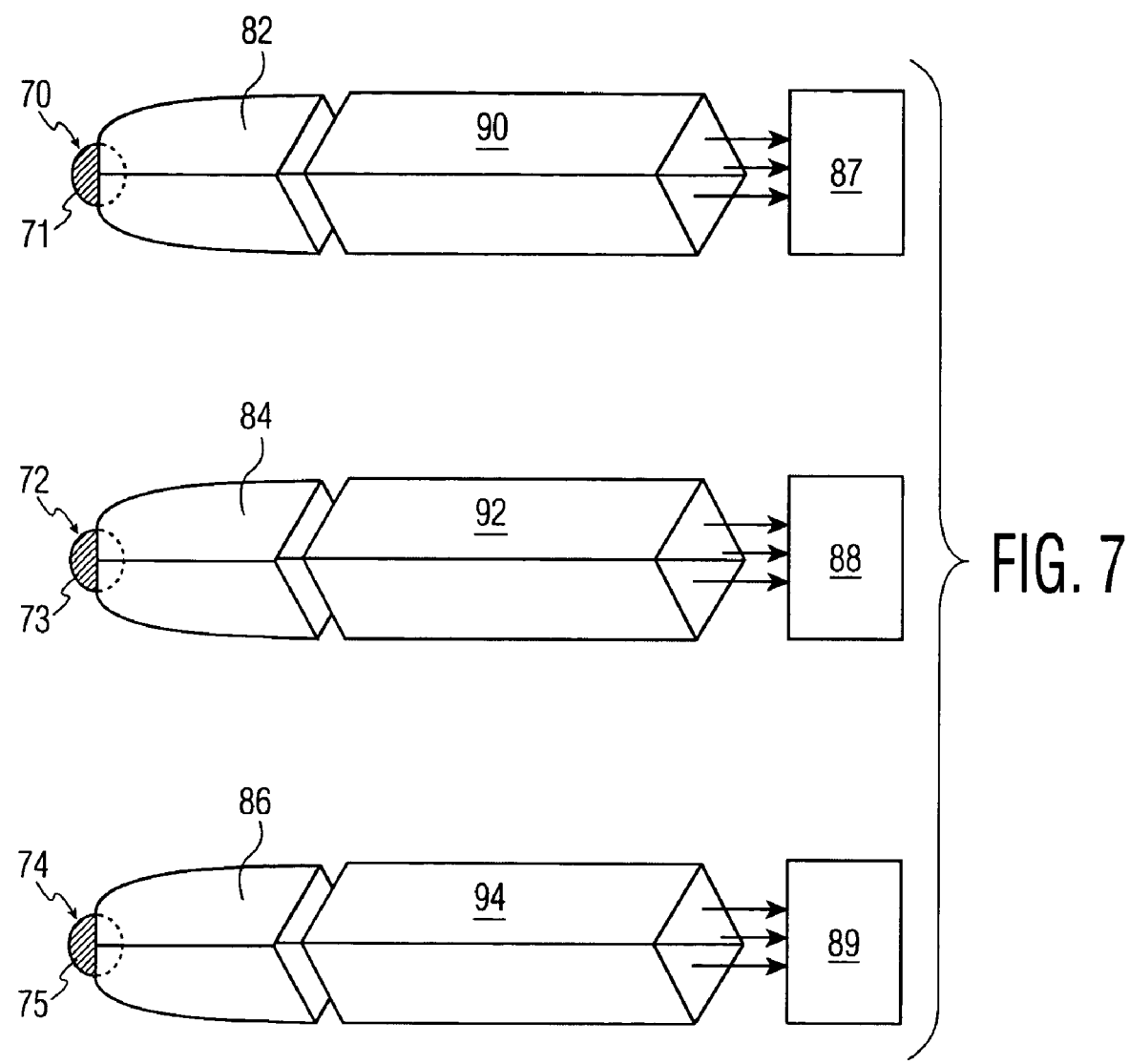
FIG. 7 is a side view in perspective, partially in block form, of an improvement to the system of FIG. 6.

FIG. 7 shows an improvement to the system of FIG. 6. FIG. 7 differs from FIG. 6 by showing square averaging rods 90, 92 and 94 respectively interposed between collectors 82, 84 and 86 and associated DPD's 87, 88 and 89. The averaging rods create a highly even distribution of light at each rod output while maintaining the proper angular distribution of light created at the output of associated collectors, for delivery to the DPD's. The rods may be coated to maximize transmission of the desired color of light and filter out all other light. They may also have a UV and IR coatings. Preferably, any coating would include an anti-reflective (AR) element to improve efficiency of light throughput.

The three-lamp systems of FIGS. 6 and 7 are possible using non-imaging optics due to the efficiencies of each lamp-collector subsystem and the relatively compact size of the collectors compared to the a system using imaging optics. Short-arc gap lamps can efficiently produce white light due to pressure broadening of the light spectrum. To produce the systems of FIGS. 6 and 7, metal halide lamps with lower pressure and larger arc gaps are preferred. Although such larger arc-gap lamps are rather inefficient in systems using imaging optics, they can be used efficiently with the inventive systems using non-imaging optics The various coatings described herein can comprise multi-layer optical interference coatings, also known as thin film coatings, especially when placed on the bulbous section, or arctube, of a light source, or on the interior of a light collector. Preferred application techniques for such coatings are sputtering chemical vapor deposition, preferably of tantala and silica oxides, and low pressure chemical vapor deposition, preferably of the foregoing oxides. Sputtering chemical vapor deposition provides more dense coverage than low pressure chemical vapor deposition, but with less uniformity.

As mentioned above with respect to collector 22 of FIG. 2a, the outlet shape of the collector is preferably rectangular (e.g., square), but can have other shapes, such as round or oblong. These variations also apply to the foregoing illumination systems for multiple DPD's.

3. Compactness of Inventive Illumination Systems

Non-imaging collectors allow compact size for an illumination system. The collectors themselves are on the order of 1/10 the size of comparable imaging-type reflectors in each of the three dimensions of height, length and width, so their volume is only 1/1000 the extent. Further, because the light exiting a non-imaging collector is diverging, the digital pixelation devices can be placed very close to the output of the collector. This allows a short system along the axis perpendicular to the digital pixelation device. In contrast, imaging systems have their light converging, so a digital pixelation device needs to be placed far away from the optics in order for the light to have converge sufficiently. Thus, illumination systems based on non-imaging optics achieve a high degree of compactness.

While the invention has been described with respect to specific embodiments by way of illustration, many modifications and changes will occur to those skilled in the art. For instance, the hollow collectors described herein could be replaced with mostly solid collectors that have a recesses for receiving a portion of a bulbous section of light source and the end arms of the light source. Additionally, although light collectors with a rectangular cross section at their outlets are shown in the drawings, light collectors with other cross sections at their outlets, such as round or oblong cross, could be used as well. It is, therefore, to be understood that the appended claims are intended to cover all such modifications and changes as fall within the true scope and spirit of the invention.

What is claimed is:

1. An illumination system for a video-imaging device, comprising:
   a) a light source; and
   b) a collector of light from the light source; the collector being formed according to the principles of non-imaging optics and receiving a portion of the light from the light source;
   c) the collector being configured to reduce the angular distribution of the collected light from the light source to match the requirements of a digital pixelation device;
   d) the shape of the collector changing from substantially round at a collector inlet to substantially rectangular along the length of the collector towards a collector outlet, with the size of the collector chosen to optimize efficient coupling to a digital pixelation device.

2. The system of claim 1, wherein the light source is a metal halide lamp.

3. The system of claim 1, wherein the light source is a high pressure mercury lamp.

4. The system of claim 1, wherein the light source is a Xenon lamp.

5. The system of claim 1, wherein the light source is a Xenon-mercury lamp.

6. The system of claim 1, wherein a portion of the light source not physically received in the collector has a coating to reflect visible light it receives towards the collector.

7. The system of claim 6, wherein the coating is applied using low pressure chemical vapor deposition of titania and silica oxides.

8. The system of claim 6, wherein the coating is applied using sputtering chemical vapor deposition of tantala and silica oxides.

9. The system of claim 6, wherein where the coating is designed to pass ultraviolet and infrared radiation.

10. An illumination system for a video-imaging device, comprising:
    a) a light source;
    b) a collector of light from the light source; the collector being formed according to the principles of non-imaging optics, receiving a portion of the light from the light source, and having an outlet;
    c) the collector being configured to reduce the angular distribution of the light collected from the light source to match the requirements of a digital pixelation device; and
    d) a spatial distribution-averaging device with an input end and an output end, the input end receiving light from the collector and providing at an output end of the device an average of light received from the collector.

11. The system of claim 10, wherein the spatial distribution-averaging device comprises a solid glass rod with a rectangular cross section along the length of the rod.

12. The system of claim 10, wherein the spatial distribution-averaging device comprises a hollow glass rod with a rectangular cross section along the length of the rod.

13. The system of claim 10, wherein the input end of the spatial distribution-averaging device is sized about the same as the outlet of the collector.

14. An illumination system for video-imaging devices, comprising:
    a) lamp;
    b) a first collector of light from the light source; the collector being formed according to the principles of non-imaging optics and receiving a portion of the light from the light source; and
    c) a second collector of light from the light source; the collector being formed according to the principles of non-imaging optics and receiving a portion of the light from the light source;
    d) a first part of the lamp protruding into the first collector, and a second part of the lamp protruding into the second collector; and
    e) the collectors being designed to reduce the angular distribution of the light collected from the light source to match the requirements of a digital pixelation device.

15. The system of claim 14, wherein the first and second parts of the lamp each comprise substantially a respectively different hemisphere of the lamp.

16. The system of claim 14, wherein each of the two collectors is respectively optimized for a one or more different parts of the light spectrum.

17. The system of claim 14, wherein the light source has a first thin film, reflective coating on the first part of the lamp, and a second thin film, reflective coating on the second part of the lamp.

18. The system of claim 17, wherein the thin film reflective coating on the first part of the lamp reflects a particular range or ranges of the visible spectrum and the reflective coating on the second part of the lamp is transparent to the particular range or ranges of the visible spectrum.

19. The system of claim 17, wherein the thin film reflective coating on the second part of the lamp reflects a particular part or parts of the visible spectrum and the reflective coating on the first part of the lamp is transparent to this particular part or parts of the visible spectrum.

20. An illumination system for video-imaging devices, comprising:
   a) a light source having an arctube;
   b) a first collector of light from the light source; the collector being formed according to the principles of non-imaging optics and receiving a portion of light from the light source;
   c) a second collector of light from the light source; the second collector being formed according to the principles of non-imaging optics and receiving a portion of light from the light source; and
   d) a third collector of light from the light source; the third collector being formed according to the principles of non-imaging optics and receiving a portion of the light from the light source;
   e) said collectors being designed to reduce the angular distribution of the light to match the requirements of a digital pixelation device.

21. The system of claim 20, wherein first, second and third portions of the arctube of the light source protrude into the first, second and third collectors, respectively.

22. The system of claim 21, wherein the first, second and third portions each is substantially one-third of a circumference of the arctube of the light source with respect to a main longitudinal axis of the arctube.

23. The system of claim 21, wherein the light source is coated with at least one thin film coating that reflects light in at least one range of the visible light spectrum and transmits light in at least another range.

24. The system of claim 23, wherein:
   a) the thin film coating on the first portion reflects blue and green light, but passes red light;
   b) the thin film coating on the second portion reflects red and green light, but passes blue light; and
   c) the thin film coating on the third portion reflects red and blue light, but passes green light.

25. The system of claim 23, wherein a thin film coating on the first portion reflects and transmits different ranges of the visible light spectrum compared to thin film coatings on the second and third portions.

26. The system of claim 25, wherein the thin film coatings on the first, second and third portions are designed so that the ranges of the visible light spectrum reflected by the thin film coatings on the first and second portions are transmitted by the thin film coatings on the third portion.

27. An illumination system for video-imaging devices, comprising:
   a) a first light source to produce red light;
   b) a first collector of light from the light source; the collector being formed according to the principles of non-imaging optics and receiving a portion of light from the first light source;
   c) a second light source to produce green light;
   d) a second collector of light from the second light source; the second collector being formed according to the principles of non-imaging optics and receiving a portion of light from the second light source;
   e) a third light source to produce blue light; and
   f) a third collector of light from the third light source; the third collector being formed according to the principles of non-imaging optics and receiving a portion of light from the third light source;
   g) at least substantially one-third of a bulbous portion of the first, second and third light sources protruding into the first, second and third collectors, respectively;
   h) each of the collectors being designed to set the angular distribution of the light they pass to match the requirements of a digital pixelation device.

28. The system of claim 27, wherein the first, second and third light sources are optimized to produce red, green and blue light, respectively.

29. The system of claim 27, wherein the light sources include at least one metal halide lamps.

30. The system of claim 27, wherein the light sources include at least one light-emitting diode.

31. The system of claim 27, wherein the cross-sectional shape of each collector changes from substantially round at an inlet to substantially rectangular at an outlet along the length of the collector, with the size of the collector chosen to optimize efficient coupling to a digital pixelation device.

32. The system of claim 27, wherein the respective portions of the first, second and third light sources protruding into the first, second and third collectors, respectively, each comprise substantially a hemisphere of the respective light source.

33. The system of claim 27, wherein the portion of each light source not protruding into a respective collector has thereon a respective coating for reflecting light of the same color produced by said each light source.

34. The system of claim 33, wherein each respective coating is designed to pass any of:
   a) ultraviolet and infrared radiation;
   b) visible light which is outside of the desired color of light; and
   c) ultraviolet and infrared radiation and visible light which is outside of the desired color of light.

35. The system of claim 27, further comprising, for each collector:
   a) a respective solid rod with a square cross section along the length of the rod;
   b) the rod being positioned between a collector output and an input to a digital pixelation device; and
   c) the rod providing light at an input to the digital pixelation device representing an average of light received from the collector output.

36. The system of claim 35, wherein each of the solid rods has a coating that reflects light that is outside of the desired color range.

37. An illumination system for a video-imaging device, comprising:
   a) a light source; and
   b) a collector of light from the light source; the collector being formed according to the principles of non-imaging optics and receiving a portion of the light from the light source;
   c) the collector being configured to reduce the angular distribution of the collected light from the light source to match the requirements of a digital pixelation device;
   d) the shape of the collector changing from non-rectangular at a collector inlet, so as to match shape of an adjacent portion of the light source, to substantially rectangular along the length of the collector towards a collector outlet, with the size of the collector chosen to optimize efficient coupling to a digital pixelation device.

* * * * *

UNITED STATES PATENT AND TRADEMARK OFFICE
CERTIFICATE OF CORRECTION

PATENT NO. : 7,220,035 B2
APPLICATION NO. : 10/794623
DATED : May 22, 2007
INVENTOR(S) : Buelow, II et al.

It is certified that error appears in the above-identified patent and that said Letters Patent is hereby corrected as shown below:

Column 1, after line 6 insert:

--GOVERNMENT INTEREST

This invention was made with Government support under Agreement Number DAAH01-03-9-R001 awarded by U.S. Army Aviation and Missile Command. The government has certain rights in the invention.--

Signed and Sealed this

Eighteenth Day of August, 2009

David J. Kappos
*Director of the United States Patent and Trademark Office*